United States Patent [19]

Vassiliadis et al.

[11] Patent Number: 5,051,940
[45] Date of Patent: Sep. 24, 1991

[54] DATA DEPENDENCY COLLAPSING HARDWARE APPARATUS

[75] Inventors: Stamatis Vassiliadis, Vestal; James E. Phillips, Binghamton; Bartholomew Blaner, Newark Valley, all of N.Y.

[73] Assignee: International Business Machines Corporation, Armonk, N.Y.

[21] Appl. No.: 504,910

[22] Filed: Apr. 4, 1990

[51] Int. Cl.$^5$ .............................................. G06F 7/38
[52] U.S. Cl. .................................................. 364/736
[58] Field of Search .............. 364/736, 768, 787, 716, 364/200 MS File, 900 MS File

[56] References Cited

U.S. PATENT DOCUMENTS

| | | | |
|---|---|---|---|
| 4,754,412 | 6/1988 | Deering | 364/736 |
| 4,766,416 | 8/1988 | Noujaim | 364/736 |
| 4,775,952 | 10/1988 | Danielsson et al. | 364/736 |
| 4,819,155 | 4/1989 | Wulf et al. | 364/200 |
| 4,852,040 | 7/1989 | Oota | 364/736 |

OTHER PUBLICATIONS

Hwang, Kai & Faye A. Briggs, "Computer Architecture and Parallel Processing", 1984, pp. 325-328.
Wulf, Wm. A. "The WM Computer Architecture", Computer Architecture News, vol. 16, No. 1, Mar. 1988, pp. 70-84.
Hwang, Kai, Computer Arithmetic, 1979, pp. 88-100.
Jouppi, Norman P. & David W. Wall, "Available Instruction-Level Parallelism for Superscalar and Superpipelined Machines", Third Intn'l. Conference on Architectural Support for Prog. Languages & Operating Sys., 1989, pp. 272-282.

Primary Examiner—Gary V. Harkcom
Assistant Examiner—Long T. Nguyen
Attorney, Agent, or Firm—Baker, Maxham, Jester & Meador

[57] ABSTRACT

A multi-function ALU (arithmetic/logic unit) for use in digital data processing facilitates the execution of instructions in parallel, thereby enhancing processor performance. The proposed apparatus reduces the instruction execution latency that results from data dependency hazards in a pipelined machine. This latency reduction is accomplished by collapsing the interlocks due to these hazards. The proposed apparatus achieves performance improvement while maintaining compatibility with previous implementations designed using an identical architecture.

24 Claims, 13 Drawing Sheets

1. RR-FORMAT LOADS, LOGICALS, ARITHMETICS, COMPARES
   - LCR - LOAD COMPLEMENT
   - LPR - LOAD POSITIVE
   - LNR - LOAD NEGATIVE
   - LR - LOAD REGISTER
   - LTR - LOAD AND TEST
   - NR - AND
   - OR - OR
   - XR - EXCLUSIVE OR
   - AR - ADD
   - SR - SUBTRACT
   - ALR - ADD LOGICAL
   - SLR - SUBTRACT LOGICAL
   - CLR - COMPARE LOGICAL
   - CR - COMPARE

2. RS-FORMAT SHIFTS (NO STORAGE ACCESS)
   - SRL - SHIFT RIGHT LOGICAL
   - SLL - SHIFT LEFT LOGICAL
   - SRA - SHIFT RIGHT ARITHMETIC
   - SLA - SHIFT LEFT ARITHMETIC
   - SRDL - SHIFT RIGHT LOGICAL
   - SLDL - SHIFT LEFT LOGICAL
   - SRDA - SHIFT RIGHT ARITHMETIC
   - SLDA - SHIFT LEFT ARITHMETIC

3. BRANCHES - ON COUNT AND INDEX
   - BCT - BRANCH ON COUNT (RX-FORMAT)
   - BCTR - BRANCH ON COUNT (RR-FORMAT)
   - BXH - BRANCH ON INDEX HIGH (RS-FORMAT)
   - BXLE - BRANCH ON INDEX LOW (RS-FORMAT)

4. BRANCHES - ON CONDITION
   - BC - BRANCH ON CONDITION (RX-FORMAT)
   - BCR - BRANCH ON CONDITION (RR-FORMAT)

5. BRANCHES - AND LINK
   - BAL - BRANCH AND LINK (RX-FORMAT)
   - BALR - BRANCH AND LINK (RR-FORMAT)
   - BAS - BRANCH AND SAVE (RX-FORMAT)
   - BASR - BRANCH AND SAVE (RR-FORMAT)

FIG. 4A

6. STORES
    - STCM – STORE CHARACTERS UNDER MASK (0-4-BYTE STORE, RS-FORMAT)
    - MVI – MOVE IMMEDIATE (ONE BYTE, SI-FORMAT)
    - ST – STORE (4 BYTES)
    - STC – STORE CHARACTER (ONE BYTE)
    - STH – STORE HALF (2 BYTES)
7. LOADS
    - LH – LOAD HALF (2 BYTES)
    - L – LOAD (4 BYTES)
8. LA – LOAD ADDRESS
9. RX/SI/RS-FORMAT ARITHMETICS, LOGICALS, INSERTS, COMPARES
    - A – ADD
    - AH – ADD HALF
    - AL – ADD LOGICAL
    - N – AND
    - O – OR
    - S – SUBTRACT
    - SH – SUBTRACT HALF
    - SL – SUBTRACT LOGICAL
    - X – EXCLUSIVE OR
    - IC – INSERT CHARACTER
    - ICM – INSERT CHARACTERS UNDER MASK (0- TO 4-BYTE FETCH)
    - C – COMPARE
    - CH – COMPARE HALF
    - CL – COMPARE LOGICAL
    - CLI – COMPARE LOGICAL IMMEDIATE
    - CLM – COMPARE LOGICAL CHARACTER UNDER MASK
10. TM – TEST UNDER MASK

FIG. 4B

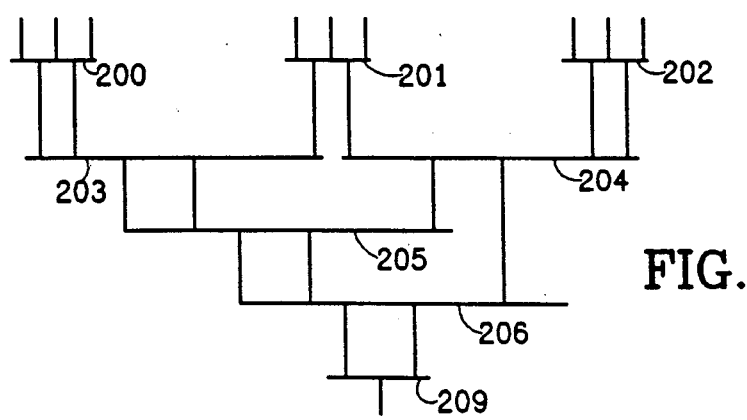

FIG. 14

| FUNCTIONS ARISING FROM LOGICAL($\phi$), ADD($\zeta$) INSTRUCTION COMPOUNDINGS |||
| --- | --- | --- |
| SEQUENCE | INTERLOCK CONDITION | FUNCTION |
| LOGICAL, ADD | R1=R3≠R2≠R4 | (R1$\phi$R2)$\zeta$R4 |
| LOGICAL, ADD | R1=R4≠R2≠R3 | R3$\zeta$(R1$\phi$R2) |
| LOGICAL, ADD | R1=R2=R3≠R4 | (R1$\phi$R1)$\zeta$R4 |
| LOGICAL, ADD | R1=R2=R4≠R3 | R3$\zeta$(R1$\phi$R1) |
| LOGICAL, ADD | R1=R3=R4≠R2 | (R1$\phi$R2)$\zeta$(R1$\phi$R2) |
| LOGICAL, ADD | R1=R2=R3=R4 | (R1$\phi$R1)$\zeta$(R1$\phi$R1) |
| ADD, LOGICAL | R1=R3≠R2≠R4 | (R1$\zeta$R2)$\phi$R4 |
| ADD, LOGICAL | R1=R4≠R2≠R3 | R3$\phi$(R1$\zeta$R2) |
| ADD, LOGICAL | R1=R2=R3≠R4 | (R1$\zeta$R1)$\phi$R4 |
| ADD, LOGICAL | R1=R2=R4≠R3 | R3$\phi$(R1$\zeta$R1) |
| ADD, LOGICAL | R1=R3=R4≠R2 | (R1$\zeta$R2)$\phi$(R1$\zeta$R2) |
| ADD, LOGICAL | R1=R2=R3=R4 | (R1$\zeta$R1)$\phi$(R1$\zeta$R1) |
| LOGICAL, LOGICAL | R1=R3≠R2≠R4 | (R1$\phi$R2)$\phi$R4 |
| LOGICAL, LOGICAL | R1=R4≠R2≠R3 | R3$\phi$(R1$\phi$R2) |
| LOGICAL, LOGICAL | R1=R2=R3≠R4 | (R1$\phi$R1)$\phi$R4 |
| LOGICAL, LOGICAL | R1=R2=R4≠R3 | R3$\phi$(R1$\phi$R1) |
| LOGICAL, LOGICAL | R1=R3=R4≠R2 | (R1$\phi$R2)$\phi$(R1$\phi$R2) |
| LOGICAL, LOGICAL | R1=R2=R3=R4 | (R1$\phi$R1)$\zeta$(R1$\phi$R1) |
| ADD, ADD | R1=R3≠R2≠R4 | (R1$\zeta$R2)$\zeta$R4 |
| ADD, ADD | R1=R4≠R2≠R3 | R3$\zeta$(R1$\zeta$R2) |
| ADD, ADD | R1=R2=R3≠R4 | (R1$\zeta$R1)$\zeta$R4 |
| ADD, ADD | R1=R2=R3≠R3 | R3$\zeta$(R1$\zeta$R1) |
| ADD, ADD | R1=R3=R4≠R2 | (R1$\zeta$R2)$\zeta$(R1$\zeta$R2) |
| ADD, ADD | R1=R2=R3=R4 | (R1$\zeta$R1)$\zeta$(R1$\zeta$R1) |

FIG. 5

| \multicolumn{4}{c}{FUNCTIONS REQUIRING IMPLEMENTATION TO COLLAPSE DATA HAZARD INTERLOCKS} |

| ROW | FUNCTION | OP1 | OP2 |
|---|---|---|---|
| 1 | AI2 | | |
| 2 | −AI2 | | |
| 3 | /AI2/ | | |
| 4 | −/AI2/ | | |
| 5 | AI1 OP1 AI2 | ∧,∨,⊕,+,− | |
| 6 | AI1 OP1 (−AI2) | ∧,∨,⊕ | |
| 7 | AI1 OP1 /AI2/ | ∧,∨,⊕ | |
| 8 | AI1 OP1 (−/AI2/) | ∧,∨,⊕ | |
| 9 | (−AI2) OP1 (−AI2) | ∧,∨,⊕ | |
| 10 | /AI2/ OP1 /AI2/ | ∧,∨,⊕ | |
| 11 | (−/AI2/) OP1 (−/AI2/) | ∧,∨,⊕ | |
| 12 | AI0 OP1 AI2 | +,− | |
| 13 | /AI0/ OP1 AI2 | +,− | |
| 14 | (−/AI0/) OP1 AI2 | +,− | |
| 15 | (−AI0) OP1 AI2 | +,− | |
| 16 | /AI0/ OP1 /AI2/ | +,− | |
| 17 | (−/AI0/) OP1 /AI2/ | +,− | |
| 18 | AI2 OP1 AI2 | ∧,∨,⊕ | |
| 19 | −(AI2 OP1 AI0) | ∧,∨,⊕ | |
| 20 | AI2 OP1 AI0 | ∧,∨,⊕ | |
| 21 | /AI2 OP1 AI0/ | ∧,∨,⊕ | |
| 22 | −/AI2 OP1 AI0/ | ∧,∨,⊕ | |
| 23 | AI1 OP2 (AI2 OP1 AI0) | +,− | +,− |
| 24 | −AI1 OP2 (AI2 OP1 AI0) | +,− | + |
| 25 | (AI2 OP1 AI0) OP2 AI1 | ∧,∨,⊕ | ∧,∨,⊕,+,− |
| 26 | (AI2 OP1 AI0) OP2 AI1 | +,− | ∧,∨,⊕ |
| 27 | −(AI2 OP1 AI0) OP2 AI1 | ∧,∨,⊕ | + |
| 28 | AI2− 1 | | |
| 29 | (−AI2)− 1 | | |

FIG. 6A

| 30 | /AI2/ − 1 | | |
|---|---|---|---|
| 31 | (−/AI2/) − 1 | | |
| 32 | (AI2 OP1 AI0) − 1 | ∧,∨,⊕,+,− | |
| 33 | (AI2 − 1) OP1 AI1 | ∧,∨,⊕ | |
| 34 | AI2 OP1 (AI0 − 1) | +,− | |
| 35 | (AI0 − 1) OP1 AI2 | +,− | |
| 36 | −(AI2 − 1) | | |
| 37 | (AI2 − 1) OP1 (AI2 − 1) | ∧,∨,⊕ | |
| 38 | /AI2 − 1/ | | |
| 39 | −/AI2 − 1/ | | |
| 40 | /AI2 OP1 AI0/ | +,− | |
| 41 | −/AI2 OP1 AI0/ | + | |
| 42 | (AI2 OP1 AI0) OP2 (AI2 OP1 AI0) | ∧,∨,⊕ | ∧,∨,⊕,+,− |
| 43 | (AI2 OP1 AI0) OP2 (AI2 OP1 AI0) | +,− | ∧,∨,⊕ |
| 44 | AI0 + AI1 + AI2 + AI3 | | |
| 45 | −AI0 + AI1 − AI2 + AI3 | | |
| 46 | (AI2 − 1) OP1 (AI2 − 1) | +,− | |

FIG. 6B

| OPERAND ROUTINGS TO PRODUCE DESIRED OPERATIONS FOR LOGICAL-ADD | | | | | | | |
|---|---|---|---|---|---|---|---|
| DESIRED OP | ALU OP | OP1 | OP2 | AI0 | AI1 | AI2 |
| (R1φR2)ζR4 | (AI2 OP1 AI0) OP2 AI1 | ∧,∨,⊕ | +,− | R2 | R4 | R1 |
| R3ζ(R1φR2) | (AI2 OP1 AI0) OP2 AI1 | ∧,∨,⊕ | + | R2 | R3 | R1 |
|  | −(AI2 OP1 AI0) OP2 AI1 | ∧,∨,⊕ | + | R2 | R3 | R1 |
| (R1φR1)ζR4 | (AI2 OP1 AI0) OP2 AI1 | ∧,∨,⊕ | +,− | R2(=R1) | R4 | R1 |
| R3ζ(R1φR1) | (AI2 OP1 AI0) OP2 AI1 | ∧,∨,⊕ | + | R2(=R1) | R3 | R1 |
|  | −(AI2 OP1 AI0) OP2 AI1 | ∧,∨,⊕ | + | R2(=R1) | R3 | R1 |
| (R1φR2)ζ(R1φR2) | (AI2 OP1 AI0) OP2 (AI2 OP1 AI0) | ∧,∨,⊕ | +,− | SEE NOTE | | |
| (R1ζR2)φR4 | (AI2 OP1 AI0) OP2 AI3 | +,− | ∧,∨,⊕ | R2 | R4 | R1 |
| R3φ(R1ζR2) | (AI2 OP1 AI0) OP2 AI1 | +,− | ∧,∨,⊕ | R2 | R3 | R1 |
| (R1ζR1)φR4 | (AI2 OP1 AI0) OP2 AI1 | +,− | ∧,∨,⊕ | R2(=R1) | R4 | R1 |
| R3φ(R1ζR1) | (AI2 OP1 AI0) OP2 AI1 | +,− | ∧,∨,⊕ | R2(=R1) | R3 | R1 |
| (R1ζR2)φ(R1ζR2) | (AI2 OP1 AI0) OP2 (AI2 OP1 AI0) | ∧,∨,⊕ | ∧,∨,⊕ | SEE NOTE | | |
| (R1φR2)ζR4 | (AI2 OP1 AI0) OP2 AI1 | ∧,∨,⊕ | ∧,∨,⊕ | R2 | R4 | R1 |
| R3φ(R1ζR2) | (AI2 OP1 AI0) OP2 AI1 | ∧,∨,⊕ | ∧,∨,⊕ | R2 | R3 | R1 |
| (R1φR1)ζR4 | (AI2 OP1 AI0) OP2 AI1 | ∧,∨,⊕ | ∧,∨,⊕ | R2(=R1) | R4 | R1 |
| R3φ(R1ζR1) | (AI2 OP1 AI0) OP2 AI1 | ∧,∨,⊕ | ∧,∨,⊕ | R2(=R1) | R3 | R1 |
| (R1φR2)φ(R1ζR2) | (AI2 OP1 AI0) OP2 (AI2 OP1 AI0) | ∧,∨,⊕ | ∧,∨,⊕ | SEE NOTE | | |
| (R1ζR2)ζR4 | AI1 OP2 (AI2 OP1 AI0) | +,− | + | R2 | R4 | R1 |
|  | −AI1 OP2 (AI2 OP1 AI0) | +,− | + | R2 | R4 | R1 |
| R3ζ(R1ζR2) | AI1 OP2 (AI2 OP1 AI0) | +,− | +,− | R2 | R3 | R1 |

FIG. 7A

| | | | | |
|---|---|---|---|---|
| (R1ζR1)ζR4 | AI1 OP2 (AI2 OP1 AI0) | +,− | + | R2(=R1) | R1 |
| | −AI1 OP2 (AI2 OP1 AI0) | +,− | + | R2(=R1) | R1 |
| R3ζ(R1ζR1) | AI1 OP2 (AI2 OP1 AI0) | +,− | +,− | R2(=R1) | R1 |
| (R1ζR2)ζ(R1ζR2) | AI2 OP1 AI0 + AI1 OP2 AI3 | +,− | +,− | SEE NOTE | |

NOTE: THESE OPERATIONS, WHICH OCCUR WHEN THE REGISTER SPECIFICATIONS FOR R1, R3, AND R4 ARE THE SAME, WERE NOT IMPLEMENTED IN THE LOGICAL DATAFLOW OF FIGURE 10; THEREFORE, THEIR OPERAND ROUTINGS WERE NOT INCLUDED.

FIG. 7A

| \multicolumn{3}{c}{FUNCTIONS REQUIRING IMPLEMENTATION TO COLLAPSE AHAZ INTERLOCKS} |||
|---|---|---|
| ROW | FUNCTION | OP1 |
| 1 | AGI2 | |
| 2 | −AGI2 | |
| 3 | /AGI2/ | |
| 4 | −/AGI2/ | |
| 5 | AGI1 OP1 AGI2 | $\wedge, \vee, \oplus, +, -$ |
| 6 | AGI0 + AGI2 | |
| 7 | AGI0 − AGI2 | |
| 8 | AGI0 + AGI2 + AGI3 | |
| 9 | AGI0 − AGI2 + AGI3 | |
| 10 | AGI0 + AGI2 − AGI3 | |
| 11 | AGI0 − AGI2 − AGI3 | |
| 12 | AGI0 + /AGI2/ | |
| 13 | AGI0 − /AGI2/ | |
| 14 | AGI0 + /AGI2/ + AGI3 | |
| 15 | AGI0 + AGI2 + /AGI3/ | |
| 16 | AGI0 + /AGI2/ + /AGI3/ | |
| 17 | AGI0 − /AGI2/ + AGI3 | |
| 18 | AGI0 + AGI2 − /AGI3/ | |
| 19 | AGI0 − /AGI2/ − /AGI3/ | |
| 20 | AGI0 + (AGI1 OP1 AGI2) | $\wedge, \vee, \oplus, +, -$ |
| 21 | AGI0 + (AGI1 OP1 AGI2) + AGI3 | $\wedge, \vee, \oplus, +, -$ |
| 22 | AGI0 + (AGI1 OP1 AGI2) + (AGI3 OP1 AGI4) | $\wedge, \vee, \oplus, +, -$ |

FIG. 10

| \multicolumn{3}{c}{FUNCTIONS REQUIRING IMPLEMENTATION TO COLLAPSE AHAZ INTERLOCKS} |
|---|---|---|
| ROW | FUNCTION | OP1 |
| 1 | BDI1 + BDI2 - BDI3 | |
| 2 | BDI1 + BDI2 + BDI3 | |
| 3 | BDI1 + BDI2 + /BDI3/ | |
| 4 | BDI1 + BDI2 - /BDI3/ | |
| 5 | BDI1 - BDI2 - BDI3 | |
| 6 | BDI1 + /BDI2/ - BDI3 | |
| 7 | BDI1 - /BDI2/ - BDI3 | |
| 8 | (-BDI0) + BDI2 - BDI3 | |
| 9 | (-BDI0) - BDI2 - BDI3 | |
| 10 | (-BDI0) + BDI2 + BDI3 | |
| 11 | BDI0 + BDI2 - BDI3 | |
| 12 | /BDI0/ + BDI2 - BDI3 | |
| 13 | /BDI0/ + BDI2 - /BDI3/ | |
| 14 | (-/BDI0/) + BDI2 - BDI3 | |
| 15 | (-/BDI0/) + BDI2 + /BDI3/ | |
| 16 | (-/BDI0/) - /BDI2/ - BDI3 | |
| 17 | /BDI0/ + /BDI2/ - BDI3 | |
| 18 | (BDI0 OP1 BDI3) + BDI1 - BDI2 | |
| 19 | BDI1 + BDI2 - (BDI3 OP1 BDI0) | $\wedge, \vee, \oplus, +, -$ |
| 20 | BDI1 - BDI2 + (BDI3 OP1 BDI0) | $\wedge, \vee, \oplus, +, -$ |
| 21 | BDI3 - 1 - 0 | |
| 22 | (-BDI3) - 1 - 0 | |
| 23 | /BDI3/ - 1 - 0 | |
| 24 | (-/BDI3/) - 1 - 0 | |
| 25 | (BDI3 OP1 BDI0) - 1 - 0 | $\wedge, \vee, \oplus, +, -$ |
| 26 | (BDI3 OP1 BDI0) + BDI2 - (BDI3 OP1 BDI0) | $\wedge, \vee, \oplus, +, -$ |
| 27 | (BDI3 OP1 BDI0) - BDI2 + (BDI3 OP1 BDI0) | $\wedge, \vee, \oplus, +, -$ |

FIG. 12

DATA DEPENDENCY COLLAPSING HARDWARE APPARATUS

BACKGROUND OF THE INVENTION

This invention relates to the execution of scalar instructions in a scalar machine. More particularly, the invention concerns the parallel execution of scalar instructions when one of the instructions uses as an operand a result produced by a concurrently-executed instruction.

Pipelining is a standard technique used by computer designers to improve the performance of computer systems. In pipelining an instruction is partitioned into several steps or stages for which unique hardware is allocated to implement the function assigned to that stage. The rate of instruction flow through the pipeline depends on the rate at which new instructions enter the pipe, rather than the pipeline's length. In an idealized pipeline structure where a maximum of one instruction is fed into the pipeline per cycle, the pipeline throughput, a measure of the number of instructions executed per unit time, is dependent only on the cycle time. If the cycle time of an n-stage pipeline implementation is assumed to be m/n, where m is the cycle time of the corresponding implementation not utilizing pipelining techniques, then the maximum potential improvement offered by pipelining is n.

Although the foregoing indicates that pipelining offers the potential of an n-times improvement in computer system performance, several practical limitations cause the actual performance gain to be less than that for the ideal case. These limitations result from the existence of pipeline hazards. A hazard in a pipeline is defined to be any aspect of the pipeline structure that prevents instructions from passing through the structure at the maximum rate. Pipeline hazards can be caused by data dependencies, structural (hardware resource) conflicts, control dependencies and other factors.

Data dependency hazards are often called write-read hazards or write-read interlocks because the first instruction must write its result before the second instruction can read and subsequently use the result. To allow this write before the read, execution of the read must be blocked until the write has occurred. This blockage introduces a cycle of inactivity, often termed a "bubble" or "stall", into the execution of the blocked instruction. The bubble adds one cycle to the overall execution time of the stalled instruction and thus decreases the throughput of the pipeline. If implemented in hardware, the detection and resolution of structural and data dependency hazards may not only result in performance losses due to the under-utilization of hardware but may also become the critical path of the machine. This hardware would then constrain the achievable cycle time of the machine. Hazards, therefore, can adversely affect two factors which contribute to the throughput of the pipeline: the number of instructions executed per cycle; and the cycle time of the machine.

The existence of hazards indicates that the scheduling or ordering of instructions as they enter a pipeline structure is of great importance in attempting to achieve effective use of the pipeline hardware. Effective use of the hardware, in turn, translates into performance gains. In essence, pipeline scheduling is an attempt to utilize the pipeline to its maximum potential by attempting to avoid hazards. Scheduling can be achieved statically, dynamically or with a combination of both techniques Static scheduling is achieved by reordering the instruction sequence before execution to an equivalent instruction stream that will more fully utilize the hardware than the former. An example of static scheduling is provided in Table I and Table II, in which the interlock between the two Load instructions has been avoided.

TABLE I

| | | |
|---|---|---|
| X1 | | ;any instruction |
| X2 | | ;any instruction |
| ADD | R4,R2 | ;R4 = R4 + R2 |
| LOAD | R1,(Y) | ;load R1 from memory location Y |
| LOAD | R1,(X[R1]) | ;load R1 from memory location X function of R |
| ADD | R3,R1 | ;R3 = R3 + R1 |
| LCMP | R1,R4 | ;load the 2's complement of (R4) to R1 |
| SUB | R1,R2 | ;R1 = R1 − R2 |
| COMP | R1,R3 | ;compare R1 with R3 |
| X3 | | ;any compoundable instruction |
| X4 | | ;any compoundable instruction |

TABLE II

| | | |
|---|---|---|
| X1 | | ;any instruction |
| X2 | | ;any instruction |
| LOAD | R1,(Y) | ;load R1 from memory location Y |
| ADD | R4,R2 | ;R4 = R4 + R2 |
| LOAD | R1,(X[R1]) | ;load R1 from memory location X function of R |
| ADD | R3,R1 | ;R3 = R3 + R1 |
| LCMP | R1,R4 | ;load the 2's complement of (R4) to R1 |
| SUB | R1,R2 | ;R1 = R1 − R2 |
| COMP | R1,R3 | ;compare R1 with R3 |
| X3 | | ;any compoundable instruction |
| X4 | | ;any compoundable instruction |

While scheduling techniques may relieve some hazards resulting in performance improvements, not all hazards can be relieved. For data dependencies that cannot be relieved by scheduling, solutions have been proposed. These proposals execute multiple operations in parallel. According to one proposal, an instruction stream is analyzed based on hardware utilization and grouped into a compound instruction for issue as a single unit. This approach differs from a "superscalar machine" in which a number of instructions are grouped strictly on a first-in-first-out basis for simultaneous issue. Assuming the hardware is designed to support the simultaneous issue of two instructions, a compound instruction machine would pair the instruction sequence of Table II as follows: (−X1) (X2 LOAD) (ADD LOAD) (ADD LCMP) (SUB COMP) (X3,X4), thereby avoiding the data dependency between the second LOAD instruction and the second ADD instruction. A comparable superscalar machine, however, would issue the following instruction pairs: (X1,X2) (LOAD,ADD) (LOAD,ADD) (LCMP SUB) (COMP X3) (X4-) incurring the penalty of the LOAD-ADD data dependency.

A second solution for the relief of data dependency interlocks has been proposed in Computer Architecture News, March, 1988, by the article entitled "The WM Computer Architecture," by W. A. Wulf. The WM Computer Architecture proposes:

1. architecting an instruction set that imbeds more than one operation into a single instruction;
2. allowing register interlocks within an architected instruction; and
3. concatenating two ALU's as shown in FIG. 1 to collapse interlocks within a single instruction.

Obviously, in Wulf's proposal, new instructions must be architected for all instruction sequence pairs whose interlocks are to be collapsed. This results in either a prohibitive number of opcodes being defined for the new instruction set, or a limit, bounded by the number mf opcodes available, being placed upon the number of operation sequences whose interlocks can be collapsed. In addition, this scheme may not be object code compatible with earlier implementations of an architecture. Other drawbacks for this scheme include the requirement of two ALUs whose concatenation can result in the execution of a multiple operation instruction requiring close to twice the execution time of a single instruction. Such an increase in execution time would reflect into an increase in the cycle time of the machine and unnecessarily penalize all instruction executions.

In the case where an existing machine has been architected to sequentially issue and execute a given set of instructions, it would be beneficial to employ parallelism in instruction issuing and execution. Parallel issue and execution would increase the throughput of the machine. Further, the benefits of such parallelism should be maximized by minimization of instruction execution latency resulting from data dependency hazards in the instruction pipeline. Thus, the adaptation to parallelism should provide for the reduction of such latency by collapsing interlocks due to these hazards. However, these benefits should be enjoyed without having to pay the costs resulting from architectural changes to the existing machine, creating a new instruction set to provide all possible instruction pairs and their combinations possessing interlocks, and adding a great deal of hardware. Further, the adaptation should present a modest or no impact on the cycle time of the machine.

SUMMARY OF THE INVENTION

The invention achieves these objectives in providing a computer architected for serial execution of a sequence of scalar operations with an apparatus for simultaneously executing a plurality of scalar instructions in a single machine cycle. The apparatus is one which collapses data dependency between simultaneously-executed instructions, which means that a pair of instructions can be executed even when one of the pair requires as an operand the result produced by execution of the other of the pair of instructions.

In this invention, the apparatus for collapsing data dependency while simultaneously executing a plurality of scalar instructions includes a provision for receiving a plurality of scalar instructions to be concurrently executed and information as to an order of execution of those instructions, a second of the scalar instructions using as an operand the result produced by execution of a first of the scalar instructions. The apparatus further has provision for receiving three operands which are used by the first and second scalar instructions and has a control component connected to the provision for receiving the instructions which generates control signals that indicate operations which execute the plurality of scalar instructions and which indicate the order of their execution. A multi-function ALU is connected to the operands and to the control provisions and responds to the control signals and the operands by producing, in parallel with execution of the first instruction, a single result corresponding to execution of the second instruction.

Viewed from another aspect, the invention is an apparatus which supports simultaneous execution of a plurality of scalar instructions where a result produced by a first of the simultaneously executing instructions is used as an operand in a second of the simultaneously executing instructions. The apparatus executes the second instruction in parallel with execution of the first instruction by provision of a data dependency-collapsing ALU which has provision for receiving three operands which are used by the first and second instruction to provide the result of the second instruction concurrently with the result of the first instruction.

It is therefore a primary object of this invention to provide an apparatus which facilitates the execution of instructions in parallel to increase existing computer performance.

A significant advantage of the apparatus is the reduction of instruction execution latency that results from data dependency hazards existing in the executed instructions.

An objective in this apparatus is to collapse the interlocks due to data dependency hazards existing between instructions which are executed in parallel.

These objectives and advantages are achieved, with a concomitant improvement in performance and instruction execution by an apparatus which is compatible with the scalar computer designed for sequential execution of the instructions.

The achievement of these and other objectives and advantages will be appreciated when the following detailed description is read with reference to the below-described drawings.

BRIEF DESCRIPTION OF THE DRAWINGS

FIGS. 4A and 4B illustrate categorization of instructions executed by an existing scalar machine.

FIG. 5 illustrates functions produced by interlocking cases where logical and add-type instructions in category 1 of FIG. 4A are combined.

FIGS. 6A and 6B specify the operations required to be performed on operands by an ALU according to the invention to support instructions contained in compoundable categories in FIGS. 4A and 4B.

FIGS. 7A and 7B summarize the routing of operands to an ALU defined in FIGS. 6A and 6B.

FIG. 10 illustrates functions requiring implementation to collapse interlocks inherent in hazards encountered in address generation.

FIG. 12 lays out the functions supported by an ALU to collapse interlocks in compounded branching instructions.

FIG. 14 illustrates an adder configuration required to collapse interlocks for instructions involving nine operands.

DETAILED DESCRIPTION OF THE PREFERRED EMBODIMENT

Figure 1:
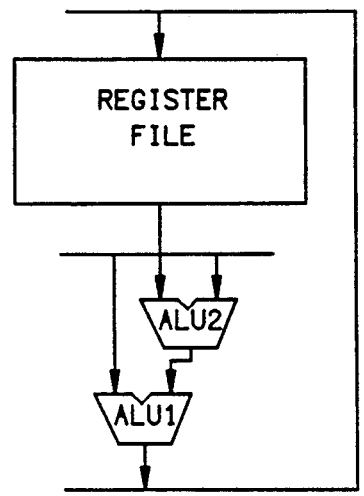
FIG. 1 illustrates a prior art architecture for execution of an instruction which pairs operations.

In the discussion which follows, the term "machine cycle" refers to the pipeline steps necessary to execute an instruction. A machine cycle includes individual intervals which correspond to pipeline stages. A "scalar instruction" is an instruction which is executed using scalar operands. Scalar operands are operands representing single-valued quantities. The term "compounding" refers to the grouping of instructions contained in a sequence of instructions, the grouping being for the purpose of concurrent or parallel execution of the grouped instructions. At minimum, compounding is represented by "pairing" of two instructions for simultaneous execution. In the invention being described, compounded instructions are unaltered from the forms they have when presented for scalar execution. As explained below, compounded instructions are accompanied by "tags", that is, bits appended to the grouped instructions which denote the grouping of the instructions for parallel execution. Thus, the bits indicate the beginning and end of a compound instruction.

In the sections to follow an improved hardware solution to relieve execution unit interlocks that cannot be relieved using prior art techniques will be described. The goal is to minimize the hardware required to relieve these interlocks and to incur only a modest or no penalty to the cycle time from the added hardware. No architectural changes are required to implement this solution; therefore, object code compatibility is maintained for an existing architecture.

The presumed existing architecture is exemplified by a sequential scalar machine such as the System/370 available from the International Business Machines Corporation, the assignee of this application. In this regard, such a system can include the System/370, the System/370 extended architecture (370-XA), and the System/370 enterprise systems architecture (370-ESA). Reference is given here to the Principles of Operation of the IBM System/370, publication number GA22-7000-10, 1987, and to the Principles of Operation, IBM Enterprise Systems Architecture/370, publication number SA22-7200-0, 1988.

The instruction set for these existing System/370 scalar architectures is well known. These instructions are scalar instructions in that they are executed by operations performed on scalar operands. References given hereinbelow to particular instructions in the set of instructions executed by the above-described machines are presented in the usual assembly-level form.

Assume the following sequence of instructions is to be executed by a superscalar machine capable of executing four instructions per cycle:

TABLE III

| (1) | LOAD | R1, X | load the content of X to R1 |
| (2) | ADD | R1, R2 | add R1 to R2 and put the result in R1 |
| (3) | SUB | R1, R3 | subtract R3 from R1 and put the result in |
| (4) | STORE | R1, Y | store the result in memory location Y |

Despite the capability of multiple instruction execution per cycle, the superscalar machine will execute the above sequence serially because of instruction interlocks. It has been suggested based on analysis of program traces, that interlocks occur approximately one third of the time. Thus much of the superscalar machine's resources will be wasted, causing the superscalar's performance to degrade. The superscalar machine performance of interlocked scalar instructions is illustrated by the timing sequence indicated by reference numeral 8 in FIG. 2. In this figure, the pipeline structure for the instructions of Table III is assumed to be as follows:
(1) LOAD:ID AG CA PA
(2) and (3) ADD and SUBTRACT:ID EX PA
where ID is instruction decode and register access, AG is operand address generation, CA represents cache access, EX represents execute, and PA (put away) represents writing the result into a register. To simplify exposition all examples provided in this description assume, unless explicitly stated, that bypassing is not implemented. In the superscalar machine, the execution of the instruction stream is serialized due to instruction interlocks reducing the performance of the superscalar to that of a scalar machine.

Figure 2:
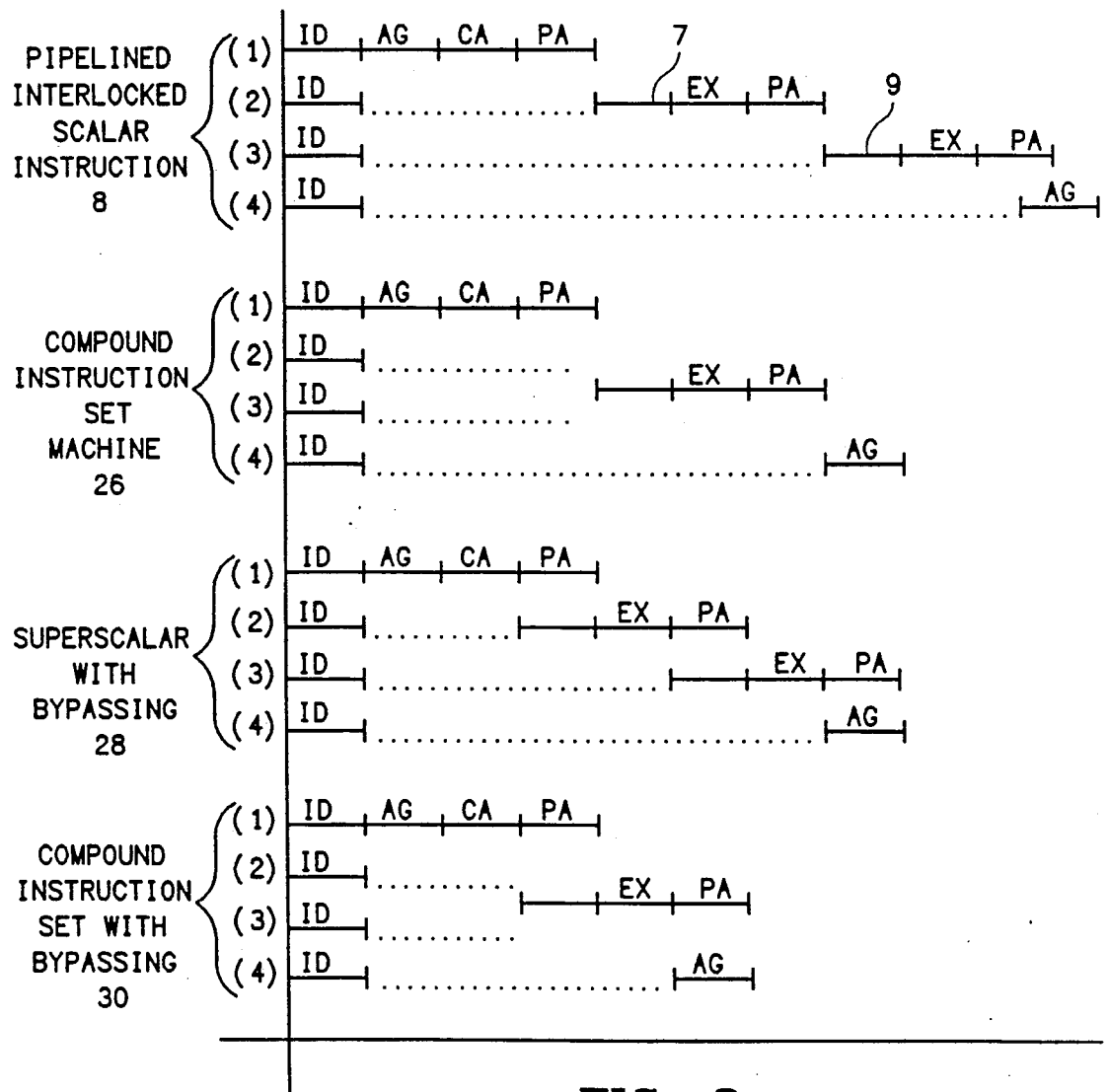
FIG. 2 is a set of timing sequences which illustrate pipelined execution of scalar instructions.

In FIG. 2, instructions (2) and (3) require no address generation (AG). However, this stage of the pipeline must be accounted for. Hence the unlabeled intervals 7 and 9. This convention holds also for the other three sequences in FIG. 2.

The above example demonstrates that instruction interlocks can constrain the parallelism that is available at the instruction level for exploitation by a superscalar machine. Performance can be gained with pipelining and bypassing of the results of one interlocked instruction to the other; nevertheless, the execution of interlocked instructions must be serialized.

COMPOUND INSTRUCTIONS

If loss of execution cycles due to interlocks is to be avoided, the interlocked instructions must be executed in "parallel" and viewed as a unique instruction. This leads to the concept of a compounded interlocked instruction, a set of scalar instructions that are to be treated as a single unique instruction despite the occurrence of interlocks. A desirable characteristic of the hardware executing a compounded instruction is that its execution requires no more cycles than required by one of the compounded instructions. As a consequence of instruction compounding and its desired characteristics, a compound instruction set machine must view scalar instructions by hardware utilization rather than opcode description.

EXECUTION OF INTERLOCKED INSTRUCTIONS

The concepts of compounded interlocked instructions can be clarified using the ADD and SUB instructions in Table III. These two instructions can be viewed as a unique instruction type because they utilize the same hardware. Consequently they are combined and executed as one instruction. To exploit parallelism their execution requires the execution of:

$$R1 = R1 + R2 - R3$$

in one cycle rather than the execution of the sequence:

$$R1 = R1 + R2$$

$$R1 = R1 - R3$$

which requires more than one cycle to execute. The interlock can be eliminated because the add and subtract utilize identical hardware. Moreover, by employing an ALU which utilizes a carry save adder, CSA, and a carry look-ahead adder, CLA, as shown in FIG. 3, the combined instruction R1+R2−R3 can be executed in one cycle provided that the ALU has been designed to execute a three-to-one addition/subtraction function.

As should be evident, the combined form (R1+R2−R3) corresponds to rewriting the two operands of the second instruction in terms of three operands, thereby implying the requirement of an adder which can execute the second instruction in response to three operands.

Figure 3:
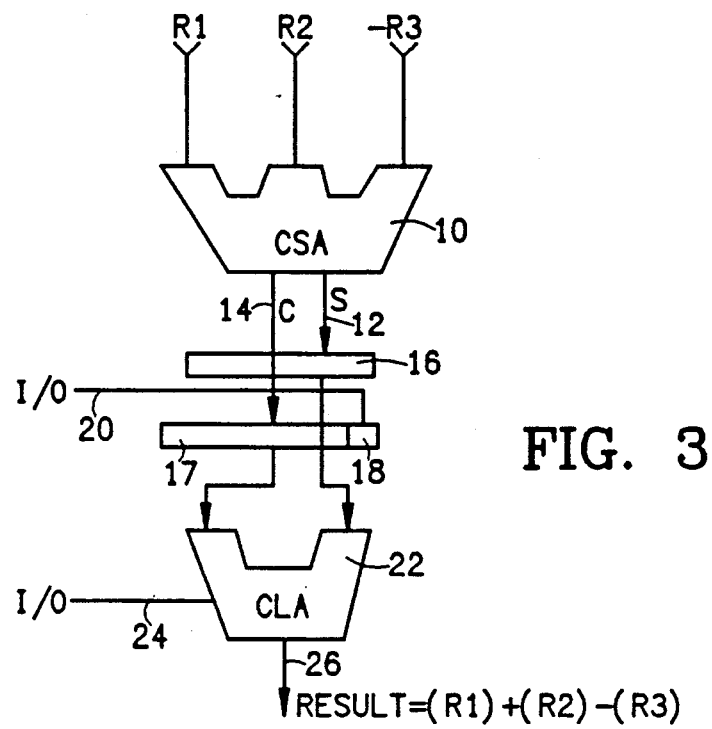
FIG. 3 is an illustration of an adder which accepts up to three operands and produces a single result.

In FIG. 3, the carry save adder (CSA) is indicated by reference numeral 10. The CSA 10 is conventional in all respects and receives three operands to produce two results, a sum (S) on output 12 and a carry (C) on output 14. For the example given above, the inputs to the CSA 10 are the operands contained in the three registers R1, R2, and R3 (complemented). The outputs of the CSA 10 are staged at 16 and 17 for the provision of a leading "1" or "0" (a "hot" 1 or 0) on the carry value by way of input 20. The value on input 20 is set conventionally according to the function to be performed by the CSA 10.

The sum and carry (with appended 1 or 0) outputs of the CSA 10 are provided as the two inputs to the carry look-ahead adder (CLA) 22. The CLA 22 also conventionally receives a "hot" 1 or 0 on input 24 according to the desired operation and produces a result on 26. In FIG. 3 the result produced by CLA 22 is the combination of the contents of the three registers R1, R2 and R3 (complemented).

Carry save and carry look-ahead adders are conventional components whose structures and functions are well known. Hwang in his COMPUTER ARITHMETIC: Principles, Architecture and Design, 1979, describes carry look-ahead adders at length on pages 88-93 and carry save adders on pages 97-100.

Despite the three-to-one addition requiring an extra stage, the CSA in FIG. 3, in the critical path of the ALU, such a stage should not compromise the cycle time of the machine since the length of other paths usually exceed that of the ALU. These critical paths are usually found in paths possessing an array access, address generation which requires a three-to-one ALU and a chip crossing; therefore, the extra stage delay is not prohibitive and the proposed scheme will result in performance improvements when compared to scalar or superscalar machines. The performance improvement is shown in FIG. 2 by the set of pipelined plots indicated by reference numeral 26. These plots show the execution of the instruction sequence under consideration by a compound instruction set machine which includes an ALU with an adder configured as illustrated in FIG. 3.

As shown by the timing sequences 8 and 26 of FIG. 2, execution of the sequence by the compound instruction set machine requires eight cycles or two cycles per instruction, CPI, as compared to the 11 cycles or 2.75 CPI achievable by the scalar and superscalar machines. If bypassing is assumed to be supported in all of the machines, plot sets 28 and 30 of FIG. 2 describe the execution achievable with the scalar/superscalar machines and the compound instruction set machine respectively. From these sets, the superscalar machine requires eight cycles or two CPI to execute the example code while the compound instruction set machine requires six cycles or 1.5 CPI. The advantage of the compounded machine over both superscalar and scalar machines should be noted along with the lack of advantage of the superscalar machine over the scalar for the assumed instruction sequence.

Compounding of instructions with their simultaneous execution by hardware is not limited to arithmetic operations. For example, most logical operations can be compounded in a manner analogous to that for arithmetic operations. Also, most logical operations can be compounded with arithmetic operations. Compounding of some instructions, however, could result in stretching the cycle time because unacceptable delays must be incurred to perform the compounded function. For example, an ADD-SHIFT compound instruction may stretch the cycle time prohibitively which would compromise the overall performance gain. The frequency of interlocks between these instructions, however, is low given the low frequency of occurrence of shift instructions; therefore, they can be executed serially without substantial performance loss.

As described previously, data hazard interlocks occur when a register or memory location is written and then read by a subsequent instruction. The proposed apparatus of this invention collapses these interlocks by deriving new functions that arise from combining the execution of instructions whose operands present data hazards while retaining the execution of functions inherent in the instruction set. Though some instruction and operand combinations would not be expected to occur in a functioning program, all combinations are considered. In general all the functions derived from the above analysis as well as the functions arising from a scalar implementation of the instruction set would be implemented. In practice, however, certain functions arise whose implementation is not well suited to the scheme proposed for this apparatus. The following presentation elucidates these concepts by discussing how new functions arise from combining the execution of two instructions. Examples of instruction sequences that are well handled according to the invention are presented along with some sequences that are not handled well. A logical diagram of the preferred embodiment of the invention is shown.

The apparatus of the invention is proposed to facilitate the parallel issue and execution of instructions. An example of issuing instructions in parallel is found in the superscalar machine of the prior art; the invention of this application facilitates the parallel execution of issued instructions which include interlocks. The use of the data dependency collapsing hardware of this invention, however, is not limited to any particular issue and execution architecture but has general applicability to schemes that issue multiple instructions per cycle.

To provide a hardware platform for the present discussion a System/370 instruction level architecture is assumed in which up to two instructions can be issued per cycle. The use of these assumptions, however, neither constrains these concepts to a System/370 architecture nor to two-way parallelism. The discussion is broken into sections cover ALU operations, memory address generation, and branch determination.

In general, the System/370 instruction set can be broken into categories of instructions that may be executed in parallel. Instructions within these categories may be combined or compounded to form a compound instruction. The below-described apparatus of the invention supports the execution of compounded instructions in parallel and ensures that interlocks existing between members of a compound instruction will be accommodated while the instructions are simultaneously executed. For example, the System/370 architecture can be partitioned into the categories illustrated in FIGS. 4A and 4B.

Rationale for this categorization was based on the functional requirements of the System/370 instructions and their hardware utilization. The rest of the System/370 instructions are not considered to be compounded for execution in this discussion. This does not preclude them from being compounded on a future compound instruction execution engine and possibly use the conclusions of interlock "avoidance" as presented by the present paper.

Consider the instructions contained in category 1 compounded with instructions from that same category as exemplified in the following instruction sequence:
AR R1,R2
SR R3,R4

This sequence, which is free of data hazard interlocks, produces the results:

$$R1 = R1 + R2$$

$$R3 = R3 + R4$$

which comprise two independent instructions specified by the 370 instruction level architecture. Executing such a sequence would require two independent and parallel two-to-one ALU's designed to the instruction level architecture. These results can be generalized to all instructions sequence pairs that are free of data hazard interlocks in which both instructions specify an ALU operation. Two ALU's are sufficient to execute instructions issued in pairs since each instruction specifies at most one ALU operation.

Many instruction sequences, however, are not free of data hazard interlocks. These data hazard interlocks lead to pipeline bubbles which degrade the performance in a typical pipeline design. A solution for increasing processor performance is to eliminate these bubbles from the pipeline by provision of a single ALU that can accommodate data hazard interlocks. To eliminate these interlocks, the ALU must execute new functions arising from instruction pairing and operand conflicts. The functions that arise depend on the ALU operations specified, the sequence of these operations, and operand "conflicts" between the operations (the meaning of the term operand conflicts will become apparent in the following discussion). All instruction sequences that can be produced by pairing instructions that are contained within the compoundable list given earlier in this section and will specify an ALU operation must be analyzed for all possible operand conflicts.

INTERLOCK-COLLAPSING ALU

The general framework for collapsing interlocks according to the invention has been presented above. The following presents a more concrete example of the analyses to be performed in determining the requirements of an interlock collapsing ALU. Assume the existence of a three-to-one adder as described above in reference to FIG. 3. Let OP1 and OP2 represent respectively the first and second of two operations to be executed. For instance, for the following sequence of instructions,
NR R1,R2
AR R3,R4

OP1 corresponds to the operation NR while OP2 corresponds to the operation AR (see below for a description of these operations). Let AI0, AI1, and AI2 represent the inputs corresponding to (R1), (R2), and (R3) respectively of the three-to-one adder in FIG. 3. Consider the analysis of compounding the set of instructions (NR, OR, XR, AR, ALR, SLR, SR), a subset of category 1 as defined in FIGS. 4A and 4B. The operations of this set of instructions are specified by:

| | |
|---|---|
| NR | Bitwise Logical AND represented by $\wedge$ |
| OR | Bitwise Logical OR represented by $\vee$ |
| XR | Bitwise Exclusive OR represented by $\oplus$ |
| AR | 32 bit signed addition represented by + |
| ALR | 32 bit unsigned addition represented by + |
| SR | 32 bit signed subtraction represented by − |
| SLR | 32 bit unsigned subtraction represented by − |

This instruction set can be divided into two sets for further consideration. The first set would include the logical instructions NR, OR and XR, and the second set would include the arithmetic instructions, AR, ALR, SR, and SLR. The grouping of the arithmetics can be justified as follows. The AR and ALR can both be viewed as an implicit 33 bit 2's complement addition by using sign extension for AR and 0 extension for ALR and providing a hot '0' to the adder. Though the setting of condition code and overflow are unique for each instruction, the operation performed by the adder, a binary addition, is common to both instructions. Similarly, SR and SLR can be viewed as an implicit 33 bit 2's complement addition by using sign extension for SR and 0 extension for SLR, inverting the subtrahend, and providing a hot '1' to the adder. The inversion of the subtrahend is considered to be external to the adder. Because the four arithmetic operations essentially perform the same operation, a binary add, they will be referred to as ADD-type instructions while the logical operations will be referred to as LOGICAL-type instructions.

As a result of the reduction of the above instruction set to two operations, the following sequences of operations must be considered to analyze the compounding of this instruction set:
LOGICAL followed by ADD
ADD followed by LOGICAL
LOGICAL followed by LOGICAL
ADD followed by ADD.

For each of these sequences, all combinations of registers must be considered. The combinations are all four register specifications are different plus the number of ways out of four possible register specifications that: 1) two are the same; 2) three are the same; and 3) four are the same. The number of combinations, therefore, can be expressed as:

$$\text{Number of combinations} = 1 + \sum_{i=2}^{4} {}_4C_i$$

where $_nC_r$ represents n combined r at a time. But, $$_nC_r = n!/((n-r)!r!)$$

from which formulas the number of combinations can be found to be 12. These 12 register combinations are:
1. $R1 \neq R2 \neq R3 \neq R4$
2. $R1 = R2 \neq R3 \neq R4$
3. $R2 = R3 \neq R1 \neq R4$ 4. $R2 = R4 \neq R1 \neq R3$
5. $R3 = R4 \neq R1 \neq R2$
6. $R2 = R3 = R4 \neq R1$
7. $R1 = R3 \neq R2 \neq R4$
8. $R1 = R4 \neq R2 \neq R3$
9. $R1 = R2 = R3 \neq R4$
10. $R1 = R2 = R4 \neq R3$
11. $R1 = R3 = R4 \neq R2$
12. $R1 = R2 = R3 = R4$ Of these combinations, only seven through twelve give rise to data dependency interlocks. The functions produced by the above interlocking cases for the LOGICAL-ADD sequences listed earlier are given in FIG. 5. In this Figure, the LOGICAL-type operations are designated by an $\phi$ and the ADD-type operations are denoted by $\zeta$.

While FIG. 5 specifies the operations that must be performed on the operands of ADD-type and LOGICAL-type instructions to collapse the interlocks, FIGS. 6A and 6B specify the ALU operations required to be performed on the ALU inputs AI0, AI1, and AI2 to support all 370 instructions that are contained in the compoundable categories of FIGS. 4A and 4B. In FIGS. 6A and 6B a unary — indicates 2's complement and /x/ indicates the absolute value of x. This Figure was derived using an analysis identical to that given above; however, all possible category compoundings were considered. For the operations of FIG. 5 to be executed by the ALU, the execution unit controls must route the desired register contents to the appropriate inputs of the ALU. FIGS. 7A and 7B summarize the routing of the operands that needs to occur for the ALU defined as in FIGS. 6A and 6B to perform the operations of FIG. 5. Along with these routings, the LOGICAL and ADD-type instructions have been given to facilitate the mapping of these results to FIGS. 6A and 6B. Routing for some ADD-ADD compoundings were not included since these operations require a four input ALU (see "Idiosyncrasies") and are so noted.

While the description thus far has focused the consideration of compound instruction analysis on four specifically-enumerated registers, R1, R2, R3, R4, it should be evident that the practice of the invention is not limited to any four specific registers. Rather, selection of these designations is merely an aid to analysis and understanding. In fact, it should be evident that the analysis can be generalized, as implied by the equations given above.

Figure 8:
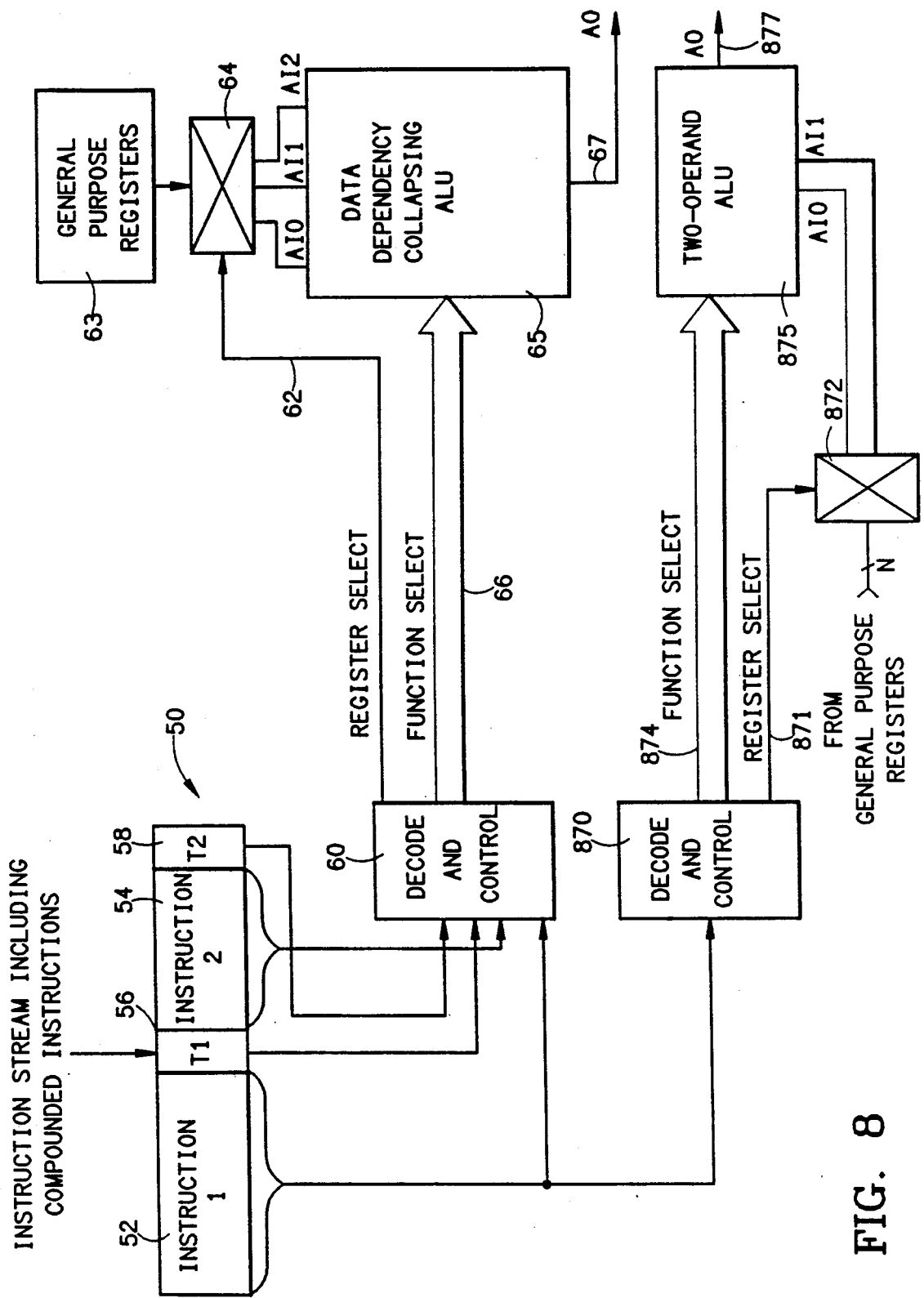
FIG. 8 is a block diagram showing how the invention is used to effect parallel execution of two interlocking instructions.

A logical block diagram illustrating an apparatus for implementing the multifunctional ALU described essentially in FIGS. 5, 6A, 6B, 7A, and 7B is illustrated in FIG. 8. In FIG. 8, a register 50 receives a compound instruction including instructions 52 and 54. The compounded instructions have appended tags 56 and 58. The instructions and their tags are provided to decode and control logic 60 which decodes the instructions and the information contained in their tags to provide register select signals on output 62 and function select signals on output 66. The register select signals on output 62 configure a cross-connect element 64 which is connected to general purpose registers 63 to provide the contents of up to three registers to the three operand inputs AI0, AI1, and AI2 of a data dependency collapsing ALU 65. The ALU 65 is a multi-function ALU whose functionality is selected by function select signals provided on the output 66 of the decode and control logic 60. With operands provided from the registers connected through the cross-connect 64, the ALU 65 will perform the functions indicated by the function select signals produce a result on output 67.

Operating in parallel with the above-described ALU apparatus is a second ALU apparatus including decode and control logic 70 which decodes the first instruction in the instruction field 52 to provide register select signals to a conventional cross connect 872 which is also connected to the general purpose registers 63. The logic 870 also provides function select signals on output 874 to a conventional two-operand ALU 875. This ALU apparatus is provided for execution of the instruction in instruction field 52, while the second instruction in instruction field 54 is executed by the ALU 65. As described below, the ALU 65 can execute the second instruction whether or not one of its operands depends upon result data produced by execution of the first instruction. Both ALUs therefore operate in parallel to provide concurrent execution of two instructions, whether or not compounded.

Returning to the compounded instructions 52 and 54 and the register 50, the existence of a compounder is presumed. It is asserted that the compounder pairs or compounds the instructions from an instruction stream including a sequence of scalar instructions input to a scalar computing machine in which the compounder resides. The compounder groups instructions according to the discussion above. For example, category 1 instructions (FIG. 5) are grouped in logical/add, add/logical, logical/logical, and add/add pairs in accordance with Table 5. To each instruction of a compound set there is added a tag containing control information. The tag includes compounding bits which refer to the part of a tag used specifically to identify groups of compound instructions. Preferably, in the case of compounding two instructions, the following procedure is used to indicate where compounding occurs. In the System/370 machines, all instructions are aligned on a half word boundary and their lengths are either 2, 4 or 6 bytes. In this case, a compounding tag is needed for every half word. A one-bit tag is sufficient to indicate whether an instruction is or is not compounded. Preferably, a "1" indicates that the instruction that begins in a byte under consideration is compounded with the following instruction. A "0" indicates no compounding. The compounding bit associated with half words that do not contain the first byte of an instruction is ignored. The compounding bit for the first byte of the second instruction in the compound pair is also ignored. Consequently, only one bit of information is needed to identify and appropriately execute compounded instructions. Thus, the tag bits 56 and 58 are sufficient to inform the decode and control logic 60 that the instructions in register fields 52 and 54 are to be compounded, that is executed in parallel. The decode and control logic 60 then inspects the instructions 52 and 54 to determine what their execution sequence is, what interlock conditions, if any obtain, and what functions are required. This determination is illustrated for category 1 instructions in FIG. 5. The decode and control logic also determines the functions required to collapse any data hazard interlock as per FIGS. 6A and 6B. These determinations are consolidated in FIGS. 7A and 7B. In FIGS. 7A and 7B, assuming that the decode and control logic 60 has, from the tag bits, determined that instructions in fields 52 and 54 are to be compounded, the logic 60 sends out a function select signal on output 66 indicating the desired operation according to the left-most column of FIG. 7A. The OP codes of the instructions are explicitly decoded to provide, in the function select output, the specific operations in the columns headed OP1 and OP2 of FIGS. 7A and 7B. The register select signals on output 62 route the registers in FIG. 8 by way of the cross-connect 64 as required in the AI0, AI1, and AI2 columns of FIGS. 7A and 7B. Thus, for example, assume that the first instruction in field 52 is ADD R1, R2, and that the second instruction is ADD R1, R4. The eighteenth line in FIG. 7A shows the ALU operations which the decode and control circuit indicates by OP1= + and OP2= +, while register R2 is routed to input AI0, register R4 to input AI1, and register R1 to input AI2.

Figure 9:
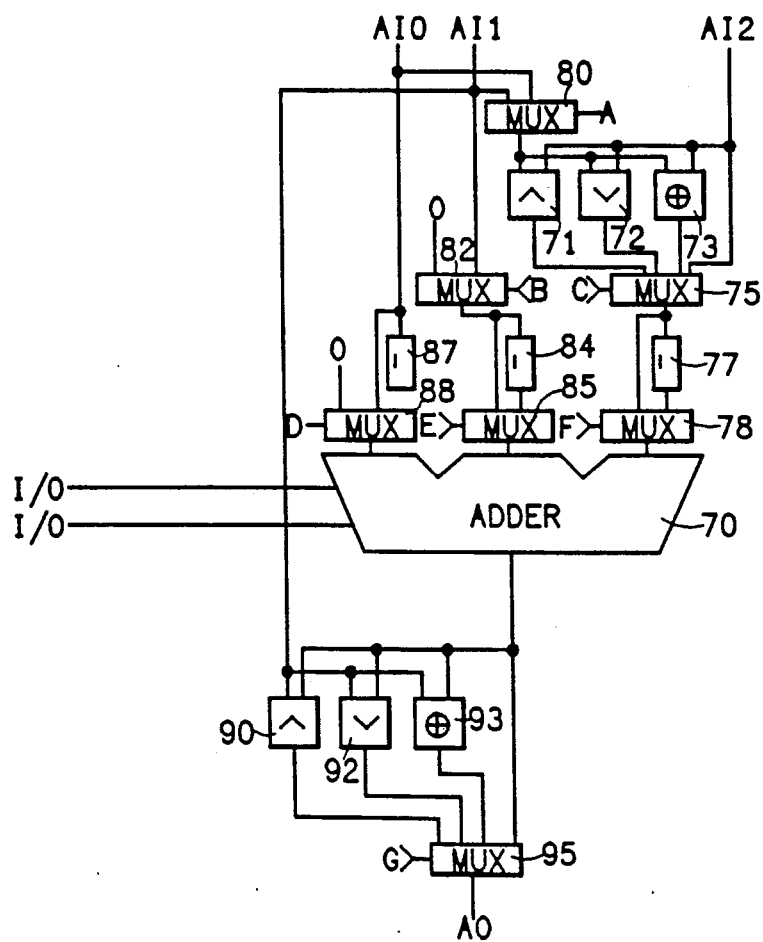
FIG. 9 is a multi-function ALU defined by FIGS. 6A, 6B, 7A, and 7B.

Refer now to FIG. 9 for an understanding of the structure and operation of the data dependency collapsing ALU 65. In FIG. 9, a three-operand, single-result adder 70, corresponding to the adder of FIG. 3 is shown. The adder 70 obtains inputs through circuits connected between the adder inputs and the ALU inputs AI0, AI1, and AI2. From the input AI2, an operand is routed through three logic functional elements 71, 72 and 73 corresponding to logical AND, logical OR, and logical EXCLUSIVE-OR, respectively. This operand is combined in these logical elements with one of the other operands and routed to AI0 or AI1 according to the setting of the multiplexer 80. The multiplexer 75 selects either the unaltered operand connected to AI2 or the output of one of the logical elements 71, 72, or 73. The input selected by the multiplexer 75 is provided to an inverter 77, and the multiplexer 78 connects to one input of the adder 70 either the output of the inverter 77 or the uninverted output of the multiplexer 75. The second input to the adder 70 is obtained from ALU input AI1 by way of a multiplexer 82 which selects either "0" or the operand connected to ALU input AI1. The output of the multiplexer is inverted through inverter 84 and the multiplexer 85 selects either the noninverted or the inverted output of the multiplexer 82 as a second operand input to the adder 70. The third input to the adder 70 is obtained from input AI0 which is inverted through inverter 87. The multiplexer 88 selects either "0", the operand input to AI0, or its inverse provided as a third input to the adder 70. The ALU output is obtained through the multiplexer 95 which selects the output of the adder 70 or the output of one of the logical elements 90, 92 or 93. The logical elements 90, 92, and 93 combine the output of the adder by means of the indicated logical operation with the operand input to AI1.

It should be evident that the function select signal consists essentially of the multiplexer select signals A B C D E F G and the "hot" 1/0 selections input to the adder 70. It will be evident that the multiplexer select signals range from a single bit for signals A, B, E, and F to two-bit signals for C, D, and G.

The states of the complex control signal (A B C D E F G 1/0 1/0) are easily derived from FIG. 7A and 7B. For example, following the ADD R1, R2 ADD R1, R4 example given above, the OP1 signal would set multiplexer signal C to select the signal present on AI2, while the F signal would select the noninverted output of the multiplexer 75, thereby providing the operand in R1 to the right-most input of the adder 70. Similarly, the multiplexer signals B and E would be set to provide the operand available at AI1 in uninverted form to the middle input of the adder 70, while the multiplexer signal D would be set to provide the operand at AI0 to the left-most input of the adder 70, without inversion. Last, the two "I/O" inputs are set appropriately for the two add operations. With these inputs, the output of the adder 70 is simply the sum of the three operands, which corresponds to the desired output of the ALU. Therefore, the control signal G would be set so that the multiplexer 95 would output the result produced by the adder 70, which would be the sum of the operands in registers R1, R2, and R3.

When instruction compounding a logical/add sequence, the logical function would be selected by the multiplexer 75 and provided through the multiplexer 78 to the adder 70, while the operand to be added to the logical operation would be guided through one of the multiplexers 85 or 88 to one of the other inputs of the adder 70, with a 0 being provided to the third input. In this case, the multiplexer 95 would be set to select the output of the adder 70 as the result.

Last, in an add/logical compound sequence, the two operands to be first added will be guided to two of the inputs of the adder 70, while the 0 will be provided to the third input. The output of the adder is instantaneously combined with the non-selected operand in logical elements 90, 92 and 93. The control signal G will be set to select the output of the element whose operation corresponds to the second instruction of the compound set.

More generally, FIG. 9 presents a logical representation of the data dependency collapsing ALU 65. In deriving this dataflow, the decision was made to not support interlocks in which the result of the first instruction is used as both operands of the second instruction. More discussion of this can be found in the "Idiosyncrasies" section. That this representation implements the other operations required by LOGICAL-ADD compoundings can be seen by comparing the dataflow with the function column of FIG. 5. In this column, a LOGICAL-type operation upon two operands is followed by an ADD-type operation between the LOGICAL result and a third operand. This is performed by routing the operands to be logically combined to AI0 and AI2 of FIG. 9 and through the appropriate one of logical blocks 71, 72, or 73, routing this result to the adder 70, and routing the third operand through AI1 to the adder. Inversions and provision of hot 1's or 0's are provided as part of the function select signal as required by the arithmetic operation specified. In other cases, an ADD-type operation between two operands is followed by a LOGICAL-type operation between the result of the ADD-type and a third operand. This is performed by routing the operands for the ADD-type operation to AI0 and AI2, routing these inputs to the adder, routing the output of the adder to the post-adder logical blocks 90, 92 and 93, and routing the third operand through AI3 to these post-adder logical blocks. LOGICAL-type followed by LOGICAL-type operations are performed by routing the two operands for the first LOGICAL-type to AI0 and AI2 which are routed to the pre-adder logical blocks, routing the results from the pre-adder logical blocks through the ALU without modification by addition to zero to the post-adder logical block, and routing the third operand through AI3 to the post-adder logical block. For an ADD-type operation followed by an ADD-type operation, the three operands are routed to the inputs of the adder, and the output of the adder is presented to the output of the ALU.

The operation of the ALU 65 to execute the second instruction in instruction field 54 when there is no data dependency between the first and second instructions is straightforward. In this case, only two operands are provided to the ALU. Therefore, if the second instruction is an add instruction, the two operands will be provided to the adder 70, together with a zero in the place of the third operand, with the output of the adder being selected through the multiplexer 95 as the output of the ALU. If the second instruction is a logical instruction, the logical operation can be performed by routing the two operands to the logical elements 71, 72, and 73, selecting the appropriate output, and then flowing the result through the adder 70 by providing zeros to the other two adder inputs. In this case, the output of the adder would be equal to the logical result and would be selected by the multiplexer 95 as the output of the ALU. Alternatively, one operand can be flowed through the adder by addition of two zeros, which will result in the adder 70 providing this operand as an output. This operand is combined with the other operand in the logical elements 90, 92, and 93, with the appropriate logical element output being selected by the multiplexer 95 as the output of the ALU.

When instructions are compounded as illustrated in FIG. 8, whether or not dependency exists, the instruction in instruction field 52 of register 50 will be conventionally executed by decoding of the instruction 870, 874, selection of its operands by 70, 871, 872, and performance of the selected operation on the selected operands in the ALU 875. Since the ALU 875 is provided for execution of a single instruction, two operands are provided from the selected register through the inputs AI0 and AI1, with the indicated result being provided on the output 877.

Thus, with the configuration illustrated in FIG. 8, the data dependency collapsing ALU 65, in combination with the conventional ALU 875 supports the concurrent (or parallel) execution of two instructions, even when a data dependency exists between the instructions.

AHAZ - COLLAPSING ALU

Address generation can also be affected by data hazards which will be referred to as address hazards, AHAZ. The following sequence represents a compounded sequence of System/370 instructions that is free of address hazards:
AR R1,R2
S R3,D(R4,R5)
where D represents a three nibble displacement. No AHAZ exists since R4 and R5 which are used in the address calculation were not altered by the preceding instruction. Address hazards do exist in the following sequences:
AR R1,R2
S R3,D(R1,R5)

AR R1,R2
S R3,D(R4,R1)

The above sequences demonstrate the compounding of an RR instruction (category 1 in FIG. 5) with RX instructions (category 9) presenting AHAZ. Other combinations include RR instructions compounded with RS and SI instructions.

For an interlock collapsing ALU, new operations arising from collapsing AHAZ interlocks must be derived by analyzing all combinations of instruction sequences and address operand conflicts. Analysis indicates that common interlocks, such as the ones contained in the above instruction sequences, can be collapsed with a four-to-one ALU.

The functions that would have to be supported by an ALU to collapse all AHAZ interlocks for a System/370 instruction level architecture are listed in FIG. 10. For those cases where four inputs are not specified, an implicit zero is to be provided. The logical diagram of an AHAZ interlock collapsing ALU defined by FIG. 10 is given in FIG. 11. A large subset, but not all, of the functions specified in FIG. 10 are supported by the illustrated ALU. This subset consists of the functions given in rows one to 21 of FIG. 10. The decision as to which functions to include is an implementation decision whose discussion is deferred to the "Idiosyncrasies" section.

Figure 11:
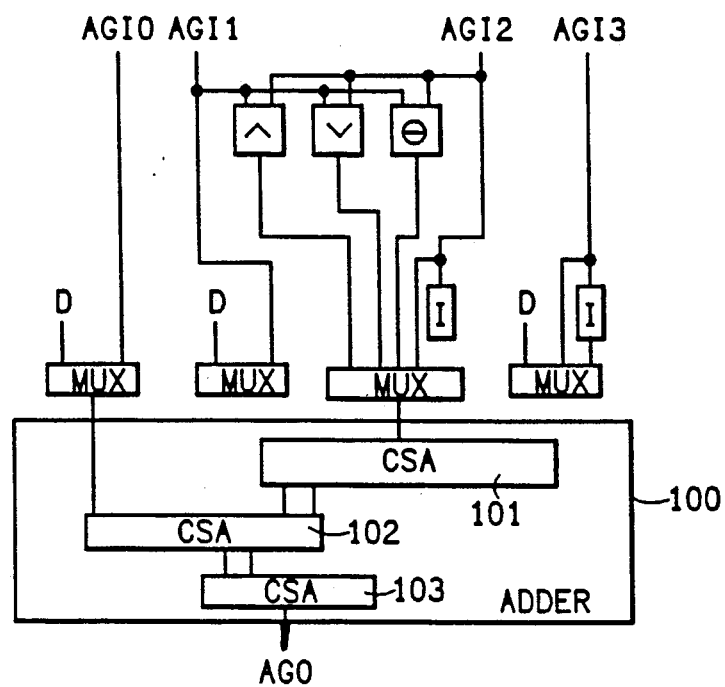
FIG. 11 is a logic diagram illustrating a multi-function ALU according to FIG. 10.

As FIG. 11 shows, the illustrated ALU includes an adder 100 in which two three-input, two-output carry save adders 101 and 102 are cascaded with a two-input, single-output carry look ahead adder 103 in such a manner that the adder 100 is effectively a four-operand, single-result adder necessary for operation of the ALU in FIG. 11.

In generating FIG. 10, the complexity of the ALU structure was simplified at the expense of the control logic. This is best explained by example. Consider the two following System/370 instruction sequences:
NR R1,R2            (4)
S R3,D(R1,R5)
and
NR R1,R2            (5)
S R3,D(R4,R1).
Let the general notation for this sequence be
NR r1,r2
S r3,D(R4,R5).
For the first sequence, the address of the operand is:

$$OA = D + (R1 \cap R2) + 5$$

while that for the second sequence is:

$$OA = D + R4 + (R1 \cap R2)$$

To simplify the execution controls at the expense of ALU complexity, the following two operations would need to be executed by the ALU:

$$OA = AG10 + (AG11 \cap AG12) + AG13$$

$$OA = AG10 + AG12 + (AG11 \cap AG13)$$

in which D is fed to AGI0, r2 is fed to AGI1, r4 is fed to AGI2 and r5 is supplied to AGI3. The ALU could be simplified however if the controls detect which of r4 and r5 possess a hazard with r1 and dynamically route this register to AGI2. The other register would be fed to AGI3. For this assumption, the ALU must only support the operation:

$$OA = AG10 + (AG11 \cap AG12) + AG13$$

Trade-offs such as these are made in favor of reducing the complexity of the address generation ALU as well as the execution and branch determination ALU's.

The ALU of FIG. 11 can be substituted for the ALU 65 in FIG. 8. In this case, the decode and control logic 60 would appropriately reflect the functions of FIG. 10.

BRANCH HAZARD-COLLAPSING ALU

Figure 13:
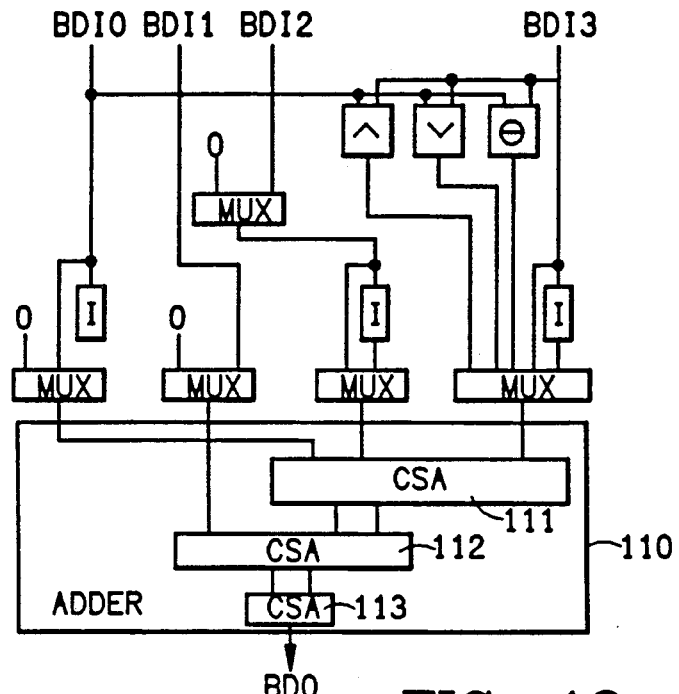
FIG. 13 is a logic diagram illustrating an ALU according to FIG. 12.

Similar analyses to those for the interlock collapsing ALU's for execution and address generation must be performed to derive the affects of compounding on a branch determination ALU which is given by FIGS. 12 and 13. The branch determination ALU covers functions required by instructions comparing register values. This includes the branch instructions BXLE, BXH, BCT, and BCTR, in which a register value is incremented by the contents of a second register (BXLE and BXH) or is decremented by one (BCT and BCTR) before being compared with a register value (BXLE and BXH) or 0 (BCT and BCTR) to determine the result of the branch. Conditional branches are not executed by this ALU.

The ALU illustrated in FIG. 13 include a multi-stage adder 110 in which two carry save adders 111 and 112 are cascaded, with the two outputs of the carry save adder 112 providing the two inputs for the carry look ahead adder 113. This combination effectively provides the four-input, single result adder provided for the ALU of FIG. 13.

As an example of the data hazards that can occur, consider the following instruction sequence:
AL R1,D(R2,R3)
BCT R1,D(R2,R3)

Let [x] denote the contents of memory location x. The results following execution are:

$$R1 = R1 + [D + R2 + R3] - 1$$

Branch if $(R1 + [D + R2 + R3]) - 1 = 0$

This comparison could be done by performing the operation:

$$R1 + [D + R2 + R3]1 - 0.$$

The results of analyses for the branch determination ALU are provided in FIGS. 12 and 13 without further discussion. The functions supported by the dataflow include those specified by rows one to 25 of FIG. 12.

The ALU of FIG. 13 can be substituted for the ALU 65 in FIG. 8. In this case, the decode and control logic 60 would appropriately reflect the functions of FIG. 12.

IDIOSYNCRASIES

Some of the functions that arise from operand conflicts are more complicated than others. For example, the instruction sequence:
AR R1,R2
AR R1,R1
requires a four-to-one ALU, along with its attendant complexity, to collapse the data interlock because its execution results in:

$$R1 = (R1 + R2) + (R1 + R2).$$

Other sequences result in operations that require additional delay to be incorporated into the ALU in order to collapse the interlock. A sequence which illustrates increased delay is:
SR R1,R2
LPR R1,R1
which results in the operation $$R1 = /R1 - R2/.$$

This operation does not lend itself to parallel execution because the results of the subtraction are needed to set up the execution of the absolute value.

Rather than collapse all interlocks in the ALU, an instruction issuing logic or a preprocessor can be provided which is designed to detect instruction sequences that lead to these more complicated functions. Preprocessor detection avoids adding delay to the issue logic which is often a near-critical path. When such a sequence is detected, the issuing logic or preprocessor would revert to issuing the sequence in scalar mode, avoiding the need to collapse the interlock. The decision as to which instruction sequences should or should not have their interlocks collapsed is an implementation decision which is dependent upon factors beyond the scope of this invention. Nevertheless, the trade-off between ALU implementation complexity and issuing logic complexity should be noted.

Hazards present in address generation also give rise to implementation trade-offs. For example, most of the address generation interlocks can be collapsed using a four-to-one ALU as discussed previously. The following sequence
AR R1,R2
S R3,D(R1,R1);
however, does not fit in this category. For this case, a five-to-one ALU is required to collapse the AHAZ interlock because the resulting operation is:

$$OA = D + (R1 + R2) + (R1 + R2)$$

where OA is the resulting operand address. As before, inclusion of this function in the ALU is an implementation decision which depends on the frequency of the occurrence of such an interlock. Similar results also apply to the branch determination ALU.

GENERALIZATION OF THE ADDER

Analyses similar to those presented can be performed to derive interlock collapsing hardware for the most general case of n interlocks. For this discussion, refer to FIG. 14. Assuming simple data interlocks such as:
AR R1,R2
AR R3,R1
in which the altered register from the first instruction is used as only one of the operands of the second instruction, a(n+1) by one ALU would be required to collapse the interlock. To collapse three interlocks, for example, using the above assumption would require a four-to-one ALU This would also require an extra CSA stage in the ALU.

The increase in the number of CSA stages required in the ALU, however, is not linear. An ALU designed to handle nine operands as a single execution unit would take four CSA stages and one CLA stage. This can be seen from FIG. 14 in which each vertical line represents an adder input and each horizontal line indicates an adder. Carry-save adders are represented by the horizontal lines 200-206, while the carry look-ahead adder is represented by line 209. Each CSA adder produces two outputs from three inputs. The reduction in input streams continues from stage to stage until the last CSA reduces the streams to two. The next adder is a CLA which produces one final output from two inputs. Assuming only arithmetic operations, a one stage CLA adder, and a four stage CSA adder, the execution of nine operands as a single unit using the proposed apparatus could be accomplished, to a first order approximation, in an equivalent time as the solution proposed by Wulf in the reference cited above.

Data hazard interlocks degrade the performance obtained from pipelined machines by introducing stalls into the pipeline. Some of these interlocks can be relieved by code movement and instruction scheduling. Another proposal to reduce the degradation in performance is to define instructions that handle data interlocks. This proposal suffers from limitations on the number of interlocks that can be handled in a reasonable instruction size. In addition, this solution is not available for 370 architecture compatible machines.

In this invention, an alternative solution for relieving instruction interlocks has been presented. This invention offers the advantages of requiring no architectural changes, not requiring all possible instruction pairs and their interlocks to be architected into an instruction set, presents only modest or no impacts to the cycle time of the machine, requires less hardware than is required in the prior art solution of FIG. 1, and is compatible with System/370-architected machines.

While the invention has been particularly shown and described with reference to the preferred embodiment thereof, it will be understood by those skilled in the art that many changes in form and details may be made therein without departing from the spirit and scope of the invention.

What is claimed is:

1. In a computer architected for serial execution of a sequence of single scalar instructions in a succession of execution cycles, an apparatus for supporting parallel execution of a plurality of scalar instructions in a single execution cycle, the apparatus comprising:
   an instruction means for receiving a plurality of scalar instructions, a first of the scalar instructions producing a result used as an operand by a second of the scalar instructions;
   an operand means for substantially simultaneously providing a plurality of operands, at least two of said operands being used by the first and second scalar instructions;
   a control means connected to the instruction means for generating control signals to indicate operations which execute the plurality of scalar instructions; and
   an execution means connected to the operand means and to the control means and responsive to the control signals and to a plurality of operands including the two operands for producing, in a single execution cycle, a single result corresponding to the performance of said operations on said plurality of operands.

2. The apparatus of claim 1, wherein the execution means includes an adder which produces a single adder result in response to three operands.

3. The apparatus of claim 2, wherein the adder includes a carry save adder which produces two outputs in response to the three operands and a carry look ahead adder, connected to the carry save adder, which produces one output in response to the two outputs of the carry save adder.

4. The apparatus of claim 2, wherein the execution means further includes logical means connected to the operand means and to the adder for performing a logic function on the operands to produce a logic result, the adder producing said single adder result in response to the logic result and one of the operands.

5. The apparatus of claim 2, wherein the execution means further includes logic means connected to the operand means and to the adder for performing a logic function on a first and second operand to produce a logic result, the execution means producing the single result in response to the logic result and the single adder result.

6. The apparatus of claim 1 wherein the first scalar instruction is a logical instruction and the second scalar instruction is an arithmetic instruction and the execution means includes logical means for combining first and second operands to produce a logical result required by said logical instruction and arithmetic means for combining the logical result with a third operand to produce said single result, said single result being required by the arithmetic instruction.

7. The apparatus of claim 1 wherein the first scalar instruction is an arithmetic instruction and the second scalar instruction is a logical instruction and the execution means includes arithmetic means for combining first and second operands to produce an arithmetic result required by said arithmetic instruction and logical means for combining the arithmetic result with a third operand to produce said single result, said single result being required by the logical instruction.

8. The apparatus of claim 1, wherein the first scalar instruction is an arithmetic instruction and the second scalar instruction is an arithmetic instruction and the execution means includes arithmetic means for combining the three operands to produce a single arithmetic result, said single arithmetic result being provided as said single result.

9. The apparatus of claim 1 wherein the first scalar instruction is a logical instruction and the second scalar instruction is a logical instruction and the execution means includes logical means for combining first and second operands to produce a first logical result, said first logical result required by said first logical instruction, and second logical means for combining the first logical result with a third operand to produce a second logical result, said second logical result being required by the second scalar instruction and said second logical result being provided as said single result.

10. A multifunction ALU (arithmetic logic unit) for combining three operands to produce a single result in response to a pair of instructions, including:
   a first set of logical elements for logically combining two operands to produce a first logical result;
   an adder for arithmetically combining three operands to produce a single arithmetic result;
   a circuit for inputting to the adder either all of said operands, two of said operands and a zero, one of said operands, a zero, and said first logical result, or two zeros and said first logical result;
   a second set of logical elements for logically combining one of said operands with said single arithmetic result to produce a second logical result; and
   a circuit for providing as an output either said arithmetic result or said second logical result.

11. The multifunction ALU of claim 10, wherein said adder includes:
   a carry-save adder for producing two outputs in response to three operands; and
   a carry look ahead adder connected to said carry save adder for producing one output in response to said two outputs.

12. In a computer architected for serial execution of a sequence of scalar instructions in a succession of execution periods, an interlock-collapsing apparatus for supporting simultaneous parallel execution of a plurality of scalar instructions, the apparatus comprising:

an instruction register means for receiving a plurality of scalar instructions for simultaneous execution, a first instruction of the plurality of scalar instructions producing a result used as an operand by a second instruction of the plurality of scalar instructions;

an operand means for substantially simultaneously providing a plurality of operands used in executing the plurality of scalar instructions;

a control means connected to the instruction register means for generating control signals to indicate operations which execute the plurality of scalar instructions; and an interlock-collapsing execution means connected to the operand means and to the control means an responsive to the control signals and to the plurality of operands for producing a single result corresponding to the simultaneous execution of first and second instructions in a single execution period.

13. The apparatus of claim 12, wherein the interlock-collapsing execution means includes an adder which produces a single adder result in response to three operands.

14. The apparatus of claim 13, wherein the adder includes a carry save adder which produces two outputs in response to the three operands and a carry lookahead adder connected to the carry save adder which produces one output in response to the two outputs of the carry save adder.

15. The apparatus of claim 13, wherein the interlock-collapsing execution means further includes logic means connected to the operand means and to the adder for performing a logic function on the operands to produce a logic result, the adder producing the single adder result in response to the logic result and one of the operands.

16. The apparatus of claim 13, wherein the interlock-collapsing execution means further includes logic means connected to the operand means and to the adder for performing a logic function on a first operand and a second operand to produce a logic result, the interlock-collapsing execution means producing the single result in response to the logic result and the single adder result.

17. The apparatus of claim 12, wherein the first instruction is a logical instruction and the second instruction is an arithmetic instruction and the interlock-collapsing execution means includes logical means for combining first and second operands to produce a logic result required by the logical instruction and arithmetic means for combining the logic result with a third operand to produce the single result, the single result representing execution of the arithmetic instruction.

18. The apparatus of claim 12, wherein the first instruction is an arithmetic instruction and the second instruction is a logic instruction and the interlock-collapsing execution means includes arithmetic means for combining first and second operands to produce an arithmetic result required by said arithmetic instruction and logic means for combining the arithmetic result with a third operand to produce the single result, the single result representing execution of the logical instruction.

19. The apparatus of claim 12, wherein the first instruction is an arithmetic instruction and the second instruction is an arithmetic instruction and the interlock-collapsing execution means includes arithmetic means for combining three operands to produce a single arithmetic result, the three operands including two operands used in the execution of the first and second instructions.

20. The apparatus of claim 12, wherein the first instruction is a first logic instruction and the second instruction is a second logic instruction and the interlock-collapsing execution means includes logic means for combining first and second operands to produce a first logic result, the first logic result being required by the first logic instruction, and second logic means for combining the first logic result with a third operand to produce a second logic result, the second logic result representing execution of the second logic instruction and the second logic result being provided as the single result.

21. In a computer architected for serial execution of a sequence of scalar instructions in a succession of execution cycles, an execution apparatus for, in a single execution cycle, producing a result representing simultaneous execution of a first scalar instruction and a second scalar instruction in which the second scalar instruction requires a result produced by execution of the first scalar instruction, the execution apparatus comprising:

an instruction register means for receiving the first and second scalar instructions;

an operand means for substantially simultaneously providing a plurality of operands, at least two of the plurality of operands being used in executing the first and second scalar instructions;

a control means connected to the instruction register means for generating control signals which indicate execution of the first scalar instruction and the second scalar instruction;

a first execution means connected to the operand means and to the control means and responsive to the control signals and to the two operands for producing, in an execution cycle, a result corresponding to the execution of the first instruction; and a second execution means connected to the operand means and to the control means and responsive to the control signals and to a plurality of operands including the two operands for producing, in said execution cycle, a single result corresponding to the execution of the first and second instructions.

22. The apparatus of claim 21, wherein the first execution means includes an adder which produces a single adder result in response to two operands.

23. The apparatus of claim 21, wherein the second execution means includes an adder which produces a single adder result in response to three operands.

24. The apparatus of claim 23, wherein the adder includes a carry save adder which produces two outputs in response to the three operands and a carry lookahead adder connected to the carry save adder, which produces one output in response to the two outputs of the carry save adder.

* * * * *